Aug. 18, 1925. 1,550,492

F. M. BIGELOW ET AL

MOLDING FLASK

Filed Dec. 10, 1924

Frank M. Bigelow
Albert J. Throm
Inventors

By *[signature]*
Attorney

Patented Aug. 18, 1925.

1,550,492

UNITED STATES PATENT OFFICE.

FRANK M. BIGELOW AND ALBERT J. THROM, OF JEANNETTE, PENNSYLVANIA.

MOLDING FLASK.

Application filed December 10, 1924. Serial No. 755,009.

*To all whom it may concern:*

Be it known that FRANK M. BIGELOW and ALBERT J. THROM, citizens of the United States of America, residing at Jeannette, in the county of Westmoreland and State of Pennsylvania, have invented new and useful Improvements in Molding Flasks, of which the following is a specification.

The purpose of the present invention is to provide a flask for molding glassware, such as plates and the like and also lenses such as are used in automobile lamps, although not necessarily for the reason that similar lenses may be used in connection with other articles where a glass shield is necessary.

Another purpose is to provide a flask including means for causing a weakened part in the glass, whereby the plate or other article to be molded may be more easily cracked from the body of the glass subsequent to the molding of the same.

Still another purpose is to provide opposed sides which are movable which not only cause weakened parts to be formed in the body of the glass but also prevent the glass from adhering to the sides of the mold.

A further purpose is the provision of means, in a hinged two-part flask, for rotating the opposed sides of the flask in opposite directions.

The invention comprises further features and combinations of parts to be hereinafter set forth, shown in the drawings and claimed.

Figure 1:
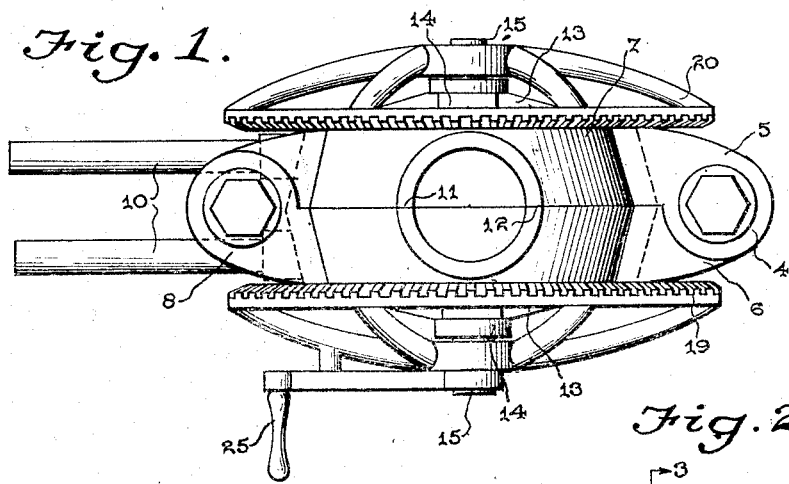
Figure 1 is a top plan view of a flask wherein the opposed sides are movable in opposite directions.
Figure 2:
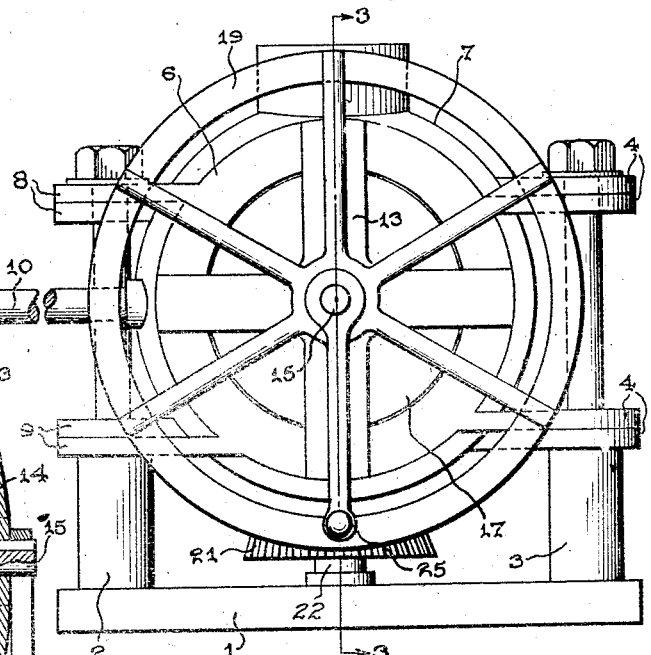
Figure 2 is a view in side elevation showing the means for rotating the opposed sides.
Figure 3:
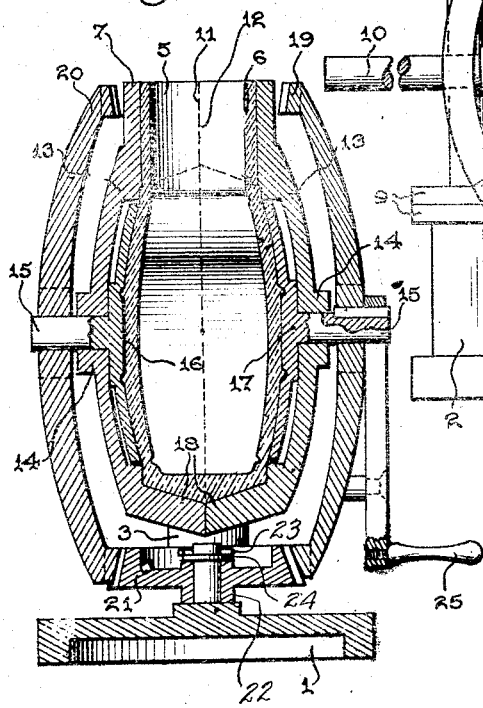
Figure 3 is a vertical sectional view on line 3—3 of Figure 2.

Referring to the drawings, particularly Figures 1, 2 and 3 thereof, 1 designates the base of the flask, and rising from its ends are supporting standards 2 and 3. The greater upper portion of the standard 2 is reduced, said reduced portion constituting a hinge pin for the hinge ears 4 of the opposed sides or members 5 and 6 of the flask designated as a whole by the numeral 7. The sides or members of the flask at positions opposite the ears 4 are provided with additional ears 8 and 9, which, when the side or member 6 is closed, register, there being apertures in the ears 8 and 9 to receive a pin to lock and hold the side or member 6 in closed position.

The sides or members 5 and 6 have handles 10 which may be grasped for the purpose of opening the opposed sides or members after molding a piece of glassware, such as a plate or the like. It is obvious that the interior of the opposed sides or members of the flask may be any proportions and any configuration, it depending entirely upon the shape of the article to be molded or blown in the mold. The sides or members 5 and 6 have semicylindrical recesses 11 and 12 which have marginal flanges and when the side or member 6 of the flask is closed, the recesses 11 and 12 register, thereby forming an opening through which the molten glass passes in blowing the article to be molded.

The bottoms of the opposed sides or members of the flask are dished and are constructed in the form of spiders 13 having central bearings 14 for the shafts 15. Carried by the inner ends of the shafts 15 and movably mounted in the dished or depressed parts of the opposed sides or members of the flask are disks 16 and 17. These disks constitute the bottoms proper of the opposed sides or members of the flask. The inner or adjacent faces of the disks 16 and 17, while preferably circular, mave have any suitable configuration. In the present instance, they have their inner or adjacent faces shaped to form the bottoms of preferably dinner plates, although they may be otherwise shaped or designed to mold or form any other figured article to be constructed of glass or similar material.

The disks 16 and 17 fit closely in the dished or depressed portions of the bottoms of the opposite sides or members of the flask, especially at the edges of the disks. The opposed sides or members of the flask, where the disks 16 and 17 are mounted, are provided with inwardly directed radial flanges 18 and where the marginal edges of the disks 16 and 17 adjoin the flanges 18, the glass forming the dinner plate or other article to be molded is somewhat weakened and when the blown article is removed, it is possible to crack the opposed molded dinner plates from the body of the glass received within the mold.

This cracking of the plate from the body of the glass may be accomplished in any well known manner; for instance, before the molded glass body entirely cools off, relatively cold rings (not shown) may be placed on the opposite sides of the glass body. Such rings may be of a diameter corresponding to the diameter of the weakened portions of the glass body so that, when the rings contact with the glass, the molded plates will crack away from the body at a point immediately adjacent the weakened parts thereof.

Keyed with the shafts 15 are opposed gears 19 and 20, the teeth of the adjacent faces of which mesh with a pinion 21 rotatably supported upon an upstanding stub shaft 22 which is carried by the flask member or side 5. A suitable cotter pin 23 and washer 24 are carried by the upper terminal portion of the stub shaft to retain the pinion 21 on the shaft.

A crank handle 25 is carried by and rotatable with one end of one of the shafts 15 and is fixed to the gear 19 so that, by grasping the crank handle, the gear 19 is rotated and due to its meshing engagement with the pinion 21, revoluble movement is transmitted to the gear 20. Since the disks 16 and 17 are movable with the shafts 15, the disks 16 and 17 are rotated in opposite directions when movement is imparted to the gear 19 by means of the crank handle. When the disks are rotated, they cause weakened portions to be formed adjacent where the margins of the disks are in proximity to the inner edge of the flange, so as to permit the plate to more readily crack at this juncture. The waste portions of the glass article blown in the mold or flask may be returned to the pot of molten glass.

The invention having been set forth, what is claimed is:

1. A molding flask for glassware blowing, consisting of opposed hinged mold members having sections thereof movable in planes with the opposite faces of the hollow molded glass body.

2. A molding flask for glassware blowing, comprising opposed complemental mold members having rotating bottoms having their inner faces provided with configurations for shaping the article to be molded.

3. A molding flask for glassware blowing, comprising opposed complemental mold members having rotating bottoms having their inner faces provided with configurations for shaping the article to be molded, and means for rotating the bottoms.

4. A molding flask for glass blowing, comprising opposed complemental mold members with opposed complemental depressions adapted to receive a glass body to be blown therein, the bottoms of the depressions being separate from the mold members and having their adjacent faces provided with configurations for shaping the articles to be cracked from the glass body.

5. A molding flask for glass blowing, comprising opposed complemental mold members with opposed complemental depressions adapted to receive a glass body to be blown therein, the bottoms of the depressions being separate from the mold members and having their adjacent faces provided with configurations for shaping the articles to be cracked from the glass body, and means for rotating the bottoms to not only prevent adherence of the glass to the adjacent faces of the bottoms but to cause a weakened portion to be created adjacent the marginal edges of the bottoms.

6. A molding flask for glass blowing comprising opposed complemental mold members provided with depressions, the bottoms of the depressions being countersunk or dished and cut away, thereby causing spiders to be constructed, disks mounted in the countersinks and rotatably supported on the spiders and having their adjacent faces provided with configurations to form the desired configurations on the article to be cracked from a glass body blown into the flask, and means for rotating the disks in opposite directions.

7. A molding flask for glass blowing, consisting of opposed complemental mold members provided with depressions to receive a hollow glass body to be blown therein, said depressions having spider bottoms, disks rotatably supported on the spider bottoms and constituting the bottoms proper of said depressions, the opposed faces of the disks being designed to cause the desired configurations to be formed on the articles to be cracked from the opposite sides of the glass body, and manual means for rotating the disks in opposite directions.

In testimony whereof they affix their signatures.

FRANK M. BIGELOW.
ALBERT J. THROM.